US009823356B2

(12) United States Patent
Sambongi

(10) Patent No.: US 9,823,356 B2
(45) Date of Patent: Nov. 21, 2017

(54) GPS RECEIVING APPARATUS, ELECTRONIC TIMEPIECE, CONTROL METHOD, AND STORAGE MEDIUM ENCODED WITH PROGRAM

(71) Applicant: CASIO COMPUTER CO., LTD., Shibuya-ku, Tokyo (JP)

(72) Inventor: Masao Sambongi, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 569 days.

(21) Appl. No.: 14/486,796

(22) Filed: Sep. 15, 2014

(65) Prior Publication Data
US 2015/0091751 A1 Apr. 2, 2015

(30) Foreign Application Priority Data
Sep. 30, 2013 (JP) .................................. 2013-205161

(51) Int. Cl.
*G01S 19/34* (2010.01)
*G01S 19/39* (2010.01)
*G04R 20/04* (2013.01)

(52) U.S. Cl.
CPC .............. *G01S 19/34* (2013.01); *G01S 19/39* (2013.01); *G04R 20/04* (2013.01)

(58) Field of Classification Search
CPC .......... G01S 19/34; G01S 19/39; G04R 20/04
USPC .................................................. 342/357.57
See application file for complete search history.

(56) References Cited

U.S. PATENT DOCUMENTS 9,191,897 B2 * 11/2015 Morrison .......... H04W 52/0261
2008/0030403 A1 * 2/2008 Honda .................... G01S 19/14
342/357.52

FOREIGN PATENT DOCUMENTS

| CN | 101118417 A | 2/2008 |
| CN | 102333351 A | 1/2012 |
| JP | 2008039565 A | 2/2008 |

OTHER PUBLICATIONS

Chinese Office Action (and English translation thereof) dated Jun. 22, 2016, issued in counterpart Chinese Application No. 201410515603.5.
Japanese Office Action (and English translation thereof) dated Apr. 11, 2017 issued in counterpart Japanese Application No. 2013-205161.

* cited by examiner

*Primary Examiner* — Frank J McGue
(74) *Attorney, Agent, or Firm* — Holtz, Holtz & Volek PC

(57) ABSTRACT

A GPS receiving apparatus according to the present invention includes: a GPS radio wave receiving unit that receives GPS radio waves; a walking state determination unit that determines a walking state of a wearer continuously for a predetermined interval; a storage unit that stores walking information determined by way of the walking state determination unit; a determination unit that determines whether being a state in which GPS radio waves can be received, based on a series of the walking states stored in the storage unit; and a control unit that causes reception of GPS radio waves to be carried out by way of the GPS radio wave receiving unit, in a case of being determined by way of the determination unit as being a state in which GPS radio waves can be received.

5 Claims, 5 Drawing Sheets

GPS RECEIVING APPARATUS, ELECTRONIC TIMEPIECE, CONTROL METHOD, AND STORAGE MEDIUM ENCODED WITH PROGRAM

This application is based on and claims the benefit of priority from Japanese Patent Application No. 2013-205161, filed on 30 Sep. 2013, the content of which is incorporated herein by reference.

BACKGROUND OF THE INVENTION

Field of the Invention

The present invention relates to a GPS receiving apparatus, electronic timepiece, control method and a storage medium encoded with a program.

Related Art

Conventionally, there are timepieces that perform time correction employing GPS (Global Positioning System). With such timepieces, reception of GPS radio waves is performed in order to employ the appropriate time of a rubidium atomic timepiece possessed by GPS satellites, and tune the time of the timepiece to this time.

In order to receive GPS radio waves, it is necessary to be in an environment in which it is possible to acquire GPS radio waves from a GPS satellite, and since GPS radio waves from a GPS satellite cannot be received in the case of being indoors or the like such as inside of a building, there has been a problem in that time correction cannot take place.

Therefore, Japanese Unexamined Patent Application, Publication No. 2008-39565 discloses technology for determining whether indoors or outdoors according to the illuminance of sun light incident on a solar panel, which is a battery charger, and then carrying out automatic time correction.

However, although the aforementioned such technology described in Japanese Unexamined Patent Application, Publication No. 2008-39565 is a method that is effective for persons active outdoors for a period of time of the daytime for which sunlight is shining down, in the case of the watch entering a state concealed under long sleeves and sufficient illuminance not being obtained, or going outside at night when there is no sunlight, there has been a deficiency in that correction of time is not carried out automatically since it will be determined as not being a state in which GPS radio waves can be received.

SUMMARY OF THE INVENTION

The present invention has been made taking such a situation into account, and has an object of providing a GPS receiving apparatus, electronic timepiece, control method and storage medium encoding a program that can determine whether being a state in which GPS radio waves are receivable without alerting the user, and reliably perform GPS radio wave reception according to this determination, and further, curbs unnecessary electricity consumption due to not causing unnecessary GPS radio wave reception to be carried out in the case of not being receivable. In order to achieve the above-mentioned object, one aspect of the present invention provides a GPS receiving apparatus that includes:

a GPS radio wave receiving unit that receives GPS radio waves;

a walking state determination unit that determines a walking state of a wearer continuously for a predetermined interval;

a storage unit that stores a walking state determined by way of the walking state determination unit;

a determination unit that determines whether being a state in which GPS radio waves can be received, based on a series of the walking states stored in the storage unit; and a control unit that causes reception of GPS radio waves to be carried out by way of the GPS radio wave receiving unit, in a case of being determined by way of the determination unit as being a state in which GPS radio waves can be received. In order to achieve the above-mentioned object, one aspect of the present invention provides a control method executed by a GPS receiving apparatus, the method including:

a GPS radio wave reception step of receiving GPS radio waves;

a walking state determination step of determining a walking state of a wearer continuously in a predetermined interval;

a storage step of storing a walking state determined in the walking state determination step;

a determination step of determining whether being a state in which GPS radio waves can be received, based on a series of the walking states stored in the storage step; and a control step of controlling to cause reception of GPS radio waves to be carried out in the GPS radio wave reception step, in a case of determining as being a state in which GPS radio waves can be received in the step of determining.

In order to achieve the above-mentioned object, one aspect of the present invention provides a non-transitory storage medium encoded with a program for causing a computer that controls a GPS receiving apparatus to function as:

a GPS radio wave receiving unit that receives GPS radio waves;

a walking state determination unit that determines a walking state of a wearer continuously for a predetermined interval;

a storage unit that stores walking states determined by way of the walking state determination unit;

a determination unit that determines whether being a state in which GPS radio waves can be received, based on a series of the walking states stored in the storage unit; and a control unit that causes reception of GPS radio waves to be carried out by way of the GPS radio wave receiving unit, in a case of being determined by way of the determination unit as being a state in which GPS radio waves can be received.

DETAILED DESCRIPTION OF THE INVENTION

Hereinafter, embodiments of the present invention will be explained using the drawings.

First Embodiment

Figure 1:
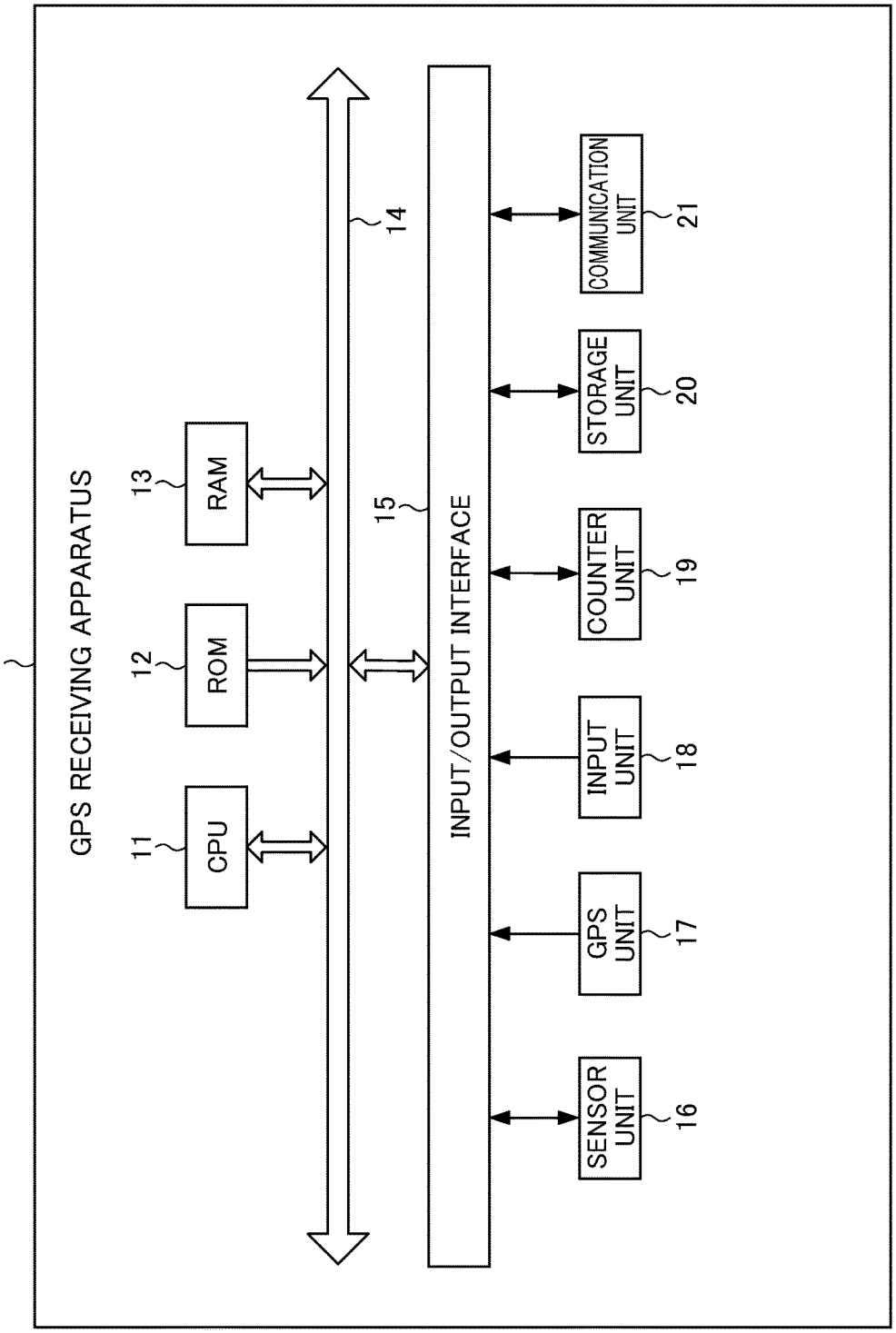
FIG. 1 is a block diagram showing the hardware configuration of a GPS receiving apparatus according to an embodiment in an information processing device of the present invention.

FIG. 1 is a block diagram showing the hardware configuration of a GPS receiving apparatus according to an embodiment of an information processing apparatus of the present invention.

A GPS receiving apparatus 1 is configured as a wristwatch-type terminal, for example.

The GPS receiving apparatus 1 includes a CPU (Central Processing Unit) 11, ROM (Read Only Memory) 12, RAM (Random Access Memory) 13, a bus 14, an input/output interface 15, an image capture unit 16, a sensor unit 16, a GPS unit 17, an input unit 18, a counter unit 19, a storage unit 20, and a communication unit 21.

The CPU 11 executes various processing according to programs that are recorded in the ROM 12, or programs that are loaded from the storage unit 20 to the RAM 13.

The RAM 13 also stores data and the like necessary for the CPU 11 to execute the various processing, as appropriate.

The CPU 11, the ROM 12 and the RAM 13 are connected to one another via the bus 14.

The input/output interface 15 is also connected to the bus 14.

The sensor unit 16, the GPS unit 17, the input unit 18, the counter unit 19, the storage unit 20, and the communication unit 21 are connected to the input/output interface 15.

The sensor unit 16 is configured by a sensor capable of detecting movement of the apparatus and, for example, is configured by an acceleration sensor, direction sensor, etc.

The GPS unit 17 is configured to be able to receive GPS radio waves used in the correction of time, from at least one satellite.

The input unit 18 is configured by various buttons, etc., and inputs various information in response to instruction operations of a user.

The counter unit 19 is configured to be able to display digital or analog time.

The storage unit 20 is configured by a hard disk, DRAM (Dynamic Random Access Memory) or the like, and stores data of various images.

The communication unit 21 controls communication with other devices (not illustrated) via networks including the Internet.

The GPS receiving apparatus 1 configured in this way has a function of not carrying out the operation of GPS radio wave reception, in the case of being in a location such that GPS radio waves cannot be received.

For this reason, with the GPS receiving apparatus 1, it is possible to curb electricity consumption due to not carrying out an unnecessary operation of GPS radio wave reception.

More specifically, with the GPS receiving apparatus 1, it is configured so as to assume the state of a user wearing the apparatus from the movement state of the apparatus, determine as indoors where reception of GPS radio waves is not possible or outdoors where reception of GPS radio waves is possible, and perform the operation of reception of GPS radio waves in the case of determining as being outdoors.

In the present embodiment, the determination of being outdoors is performed from whether or not continuously walking for a predetermined time. This is because, due to outdoors differing from indoors and being a wide range, the possibility of not continuously walking indoors for a predetermined time is high.

In addition, by defining walking as a periodic oscillation, even if moving around cyclically in a narrow range such as indoors, or moving irregularly, since a periodic oscillation is difficult to obtain, it becomes possible to determine this movement as indoors.

Figure 2:
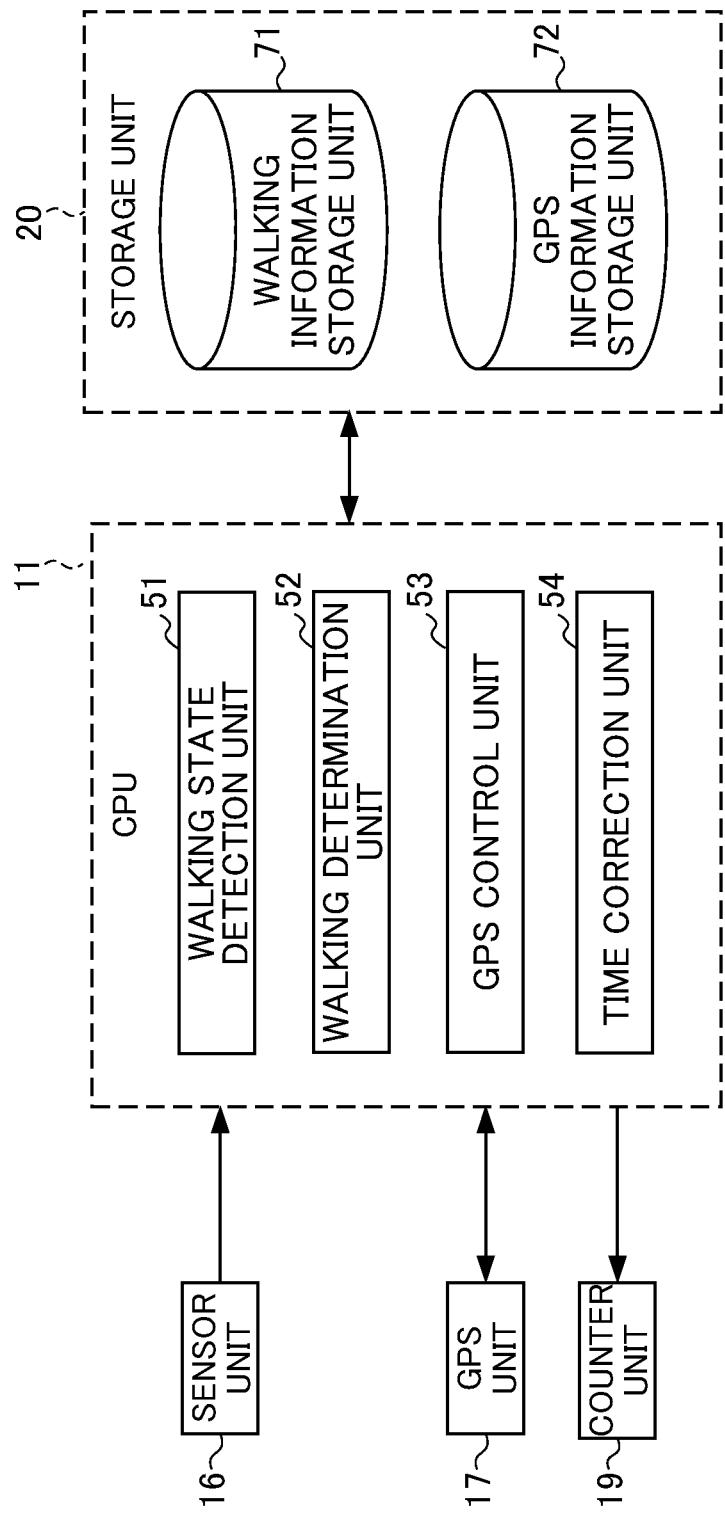
FIG. 2 is a functional block diagram showing a functional configuration for executing automatic time correction processing, among the functional configurations of the GPS receiving apparatus of FIG. 1.

FIG. 2 is a functional block diagram showing a functional configuration for executing automatic time correction processing, among the functional configurations of such a GPS receiving apparatus 1.

Automatic time correction processing refers to processing from determining whether GPS radio wave reception is possible, performing the operation of GPS radio wave reception in the case of GPS radio wave reception being possible, until performing the correction of time.

In the automatic time correction processing, as shown in FIG. 2, a walking state detection unit 51, walking determination unit 52, GPS control unit 53 and time correction unit 54 function in the CPU 11.

In addition, a walking information storage unit 71 and GPS information storage unit 72 are established in an area of the storage unit 20.

In the walking information storage unit 71, walking information of the walking state such as a number of steps, walking pitch and walking direction obtained from the sensor unit 16 is stored.

In addition, the time of walking is also stored in the walking information storage unit 71.

Furthermore, in the walking information storage unit 71, the oscillation period of walking of a general user (for example, ordinary adult male, etc.) is stored, and the oscillation period of walking calculated using the past numbers of steps, walking pitches, etc. is stored.

In the GPS information storage unit 72, GPS values acquired from the GPS unit 17 are stored.

In addition, in the GPS information storage unit 72, the time at which GPS values were acquired previously are also stored.

The walking state detection unit 51 detects the walking state.

In detail, the walking state detection unit 51 detects the presence of a walking oscillation from the sensor information of the sensor unit 16, and acquires walking information of the walking state such as the number of steps, walking pitch and walking direction.

The acquired walking information of the walking state such as the number of steps, walking pitch and walking direction is stored in the walking information storage unit 71.

The walking determination unit 52 determines, from the walking information of a series of walking states stored in the walking information storage unit 71 detected, whether outdoors where reception of GPS radio waves is possible.

In detail, the walking determination unit 52 determines as being a walking state in the case of the detected walking pitch matching with a past walking pitch (in the present embodiment, 2 Hz, which is the oscillation period of a general user), and further determines as being outdoors where reception of GPS radio waves is possible, if the time of continuously walking in this series of walking states is at least a predetermined time (in the present embodiment, 1 minute).

It should be noted that, in the present embodiment, although the time for which the number of steps is being counted, i.e. time walking, is defined as a factor in the determination of walking, the number of steps may simply be defined as the factor in the determination of walking.

In addition, the past walking pitch may be a common walking pitch calculated from statistics or the like, and may be a walking pitch of a unique user.

Furthermore, the walking determination unit 52 may determine walking by considering the past detection time in addition to the walking information of the walking states detected.

The GPS control unit 53 controls the activation, reception, etc. of the GPS unit 17, and causes the received GPS values to be stored in the GPS information storage unit 72. In detail, the GPS control unit 53 performs control of the GPS unit 17 such as activating the GPS unit 17 and establishing in a state in which radio waves from GPS can be received, in the case of determining as walking by the walking determination unit 52.

In addition, the GPS control unit 53 confirms and determines the reception strength of radio waves from GPS in the GPS unit 17.

The time correction unit 54 corrects the time of the counter unit 19 based on the GPS values stored in the GPS information storage unit 72.

Figure 3:
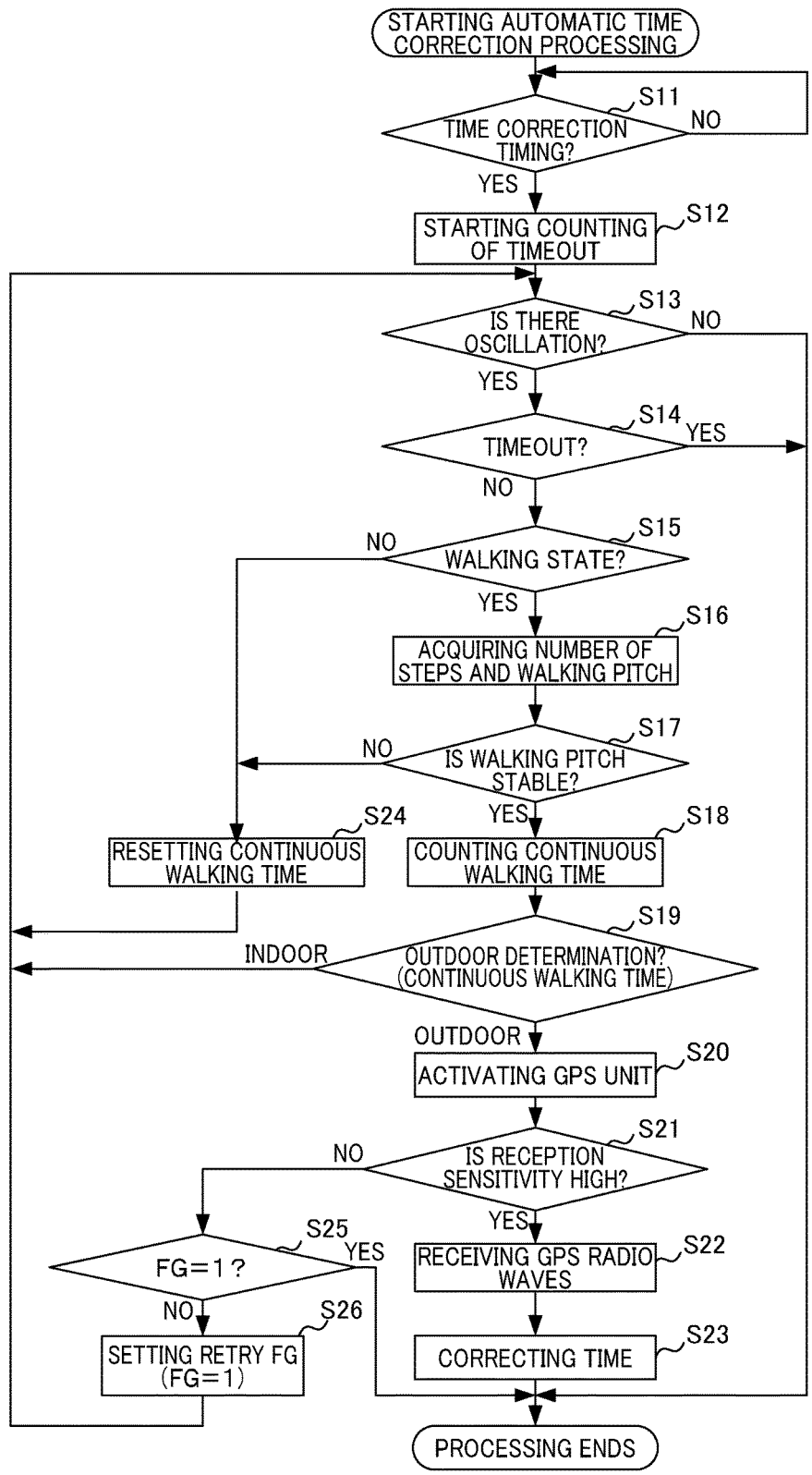
FIG. 3 is a flowchart illustrating the flow of automatic time correction processing of the first embodiment, in the GPS receiving apparatus of FIG. 1 having the functional configuration of FIG. 2.

FIG. 3 is a flowchart illustrating the flow of automatic time correction processing executed by the GPS receiving apparatus 1 of FIG. 1 having the functional configuration of FIG. 2.

In Step S11, the automatic time correction processing is initiated in the case of reaching a time correction timing, which is a predetermined reception time.

In Step S11, the CPU 11 determines whether it is the time correction timing.

In other words, the CPU 11 determines whether having reached the predetermined reception time, and thus having become the timing for the correction of time.

In the case of not being the time correction timing, it is determined as NO in Step S11, and enters a standby state until reaching the time correction timing.

In the case of having reached the time correction timing, it is determined as YES in Step S11, and the processing advances to Step S12.

In Step S12, the CPU 11 initiates counting of time-out.

In Step S13, the CPU 11 determines whether there is oscillation, based on the sensor information from the sensor 16.

In the case of there not being oscillation, it is determined as NO in Step S13, and the automatic time correction processing ends.

In the case of there being oscillation, it is determined as YES in Step S13, and the processing advances to Step S14.

In Step S14, the CPU 11 determines whether having timed out.

In other words, the CPU 11 determines whether having timed out by a predetermined time elapsing since the counting of time-out initiated.

In the case of having timed out, it is determined as NO in Step S14, and the automatic time correction processing ends.

In the case of not having timed out, it is determined as YES in Step S14, and the processing advances to Step S15.

In Step S15, the walking state detection unit 51 determines whether being a walking state from the sensor information of the sensor unit 16.

In the case of not being a walking state, it is determined as NO in Step S15, and the processing advances to Step S24.

The processing of Steps S24 and higher will be described later.

In the case of being a walking state, it is determined as YES in Step S15, and the processing advances to Step S16.

In Step S16, the walking state detection unit 51 acquires the number of steps and walking pitch from the sensor information of the sensor unit 16, and causes it to be stored in the walking information storage unit 71.

In Step S17, the walking determination unit 52 determines whether the walking pitch is stable.

In the present example, in the case of a walking pitch of 2 Hz being stably detected, it is determined as being stable.

In the case of the walking pitch not being stable, it is determined as NO in Step 17, and the processing advances to Step S24.

In the case of the walking pitch being stable, it is determined as YES in Step S17, and the processing advances to Step S18.

In Step S18, the walking determination unit 52 counts the continuous walking time for use in determination of outdoor walking.

In Step S19, the walking determination unit 52 performs outdoor determination.

In other words, as the outdoor determination, in the present example, the walking determination unit 52 determines as outdoors in the case of having counted a continuous walking time of at least 1 minute, and determines as indoors in the case of being less than 1 minute.

In the case of defining as indoors according to the outdoor determination, it is determined as NO in Step S19, and the processing returns to Step S13.

In the case of defining as outdoors according to the outdoor determination, it is determined as YES in Step S19, and the processing advances to Step S20.

In Step S20, the GPS control unit 53 activates the GPS unit 17, due to being determined as outdoor walking by way of the walking determination unit 52.

In Step S21, the GPS control unit 53 determines whether the reception sensitivity of GPS radio waves at the GPS unit 17 is high.

In the case of the reception sensitivity being low, it is determined as NO in Step S21, and the processing advances to Step S25. The processing of Steps S25 and higher will be described later.

In the case of the reception sensitivity being high, it is determined as YES in Step S21, and the processing advances to Step S22.

In Step S22, the GPS control unit 53 controls the GPS unit 17 to receive GPS radio waves. The GPS control unit 53 causes the received GPS radio waves to be stored in the GPS information storage unit 72 as GPS values.

In Step S23, the time correction unit 54 corrects the time of the counter unit 19 based on the GPS values stored in the GPS information storage unit 72.

With the GPS receiving apparatus 1, it is thereby possible to curb wasteful electricity consumption by not carrying out GPS reception in a case of not being outdoors, and to perform time correction according to GPS only in the case of being outdoors where GPS reception is possible.

In Step S24, the walking determination unit 52 resets the continuous walking time.

In Step S25, the CPU 11 determines whether being FG=1.

In other words, the CPU 11 performs confirmation of a flag, due to the reception sensitivity being low and not being able to receive accurate radio waves of GPS.

In the case of FG=0, it is a state of unset retry flag.

In the case of FG=1, since it is a state in which the reception sensitivity is low after the retry flag was already set, the automatic time correction processing is ended in order to curb electricity consumption.

In the case of being FG=1, it is determined as YES in Step S25, and the automatic time correction processing ends.

In the case of not being FG=1, it is determined as NO in Step S25, and the processing advances to Step S26.

In Step S26, the CPU 11 sets the retry FG (FG=1).

Then, the processing returns to Step S13.

Second Embodiment

In the first embodiment, the outdoor determination is configured so as to determine as outdoor in the case of counting the continuous walking time, and a continuous walking time of at least a predetermined time being counted.

In contrast, in the second embodiment, the outdoor determination is configured so as to determine as outdoor in the case of counting the time of walking linearly in the same direction from an advancing direction (hereinafter referred to as "linear walking time"), and a linear walking time of at least a predetermined time being counted. This is because, due to there being a high probability of being outdoors rather than being indoors, which is narrow, the matter of continuously moving in a specific direction is a criterion in outdoor determination.

It should be noted that, in cases of being the same configuration as the first embodiment, an explanation thereof will be omitted hereinafter.

In the case of executing the automatic time correction processing of the second embodiment, the walking state detection unit 51 and walking determination unit 52 in the CPU 11 differ from the first embodiment.

In other words, the walking state detection unit 51 acquires the advancing direction from the sensor unit 16.

Subsequently, the walking state detection unit 51 causes information of the acquired advancing direction to be stored in the walking information storage unit 71.

In addition, the walking determination unit 52 counts the linear walking time.

Then, the walking determination unit 52 determines as outdoor in the case of the linear walking time thus counted being at least a certain time.

Figure 4:
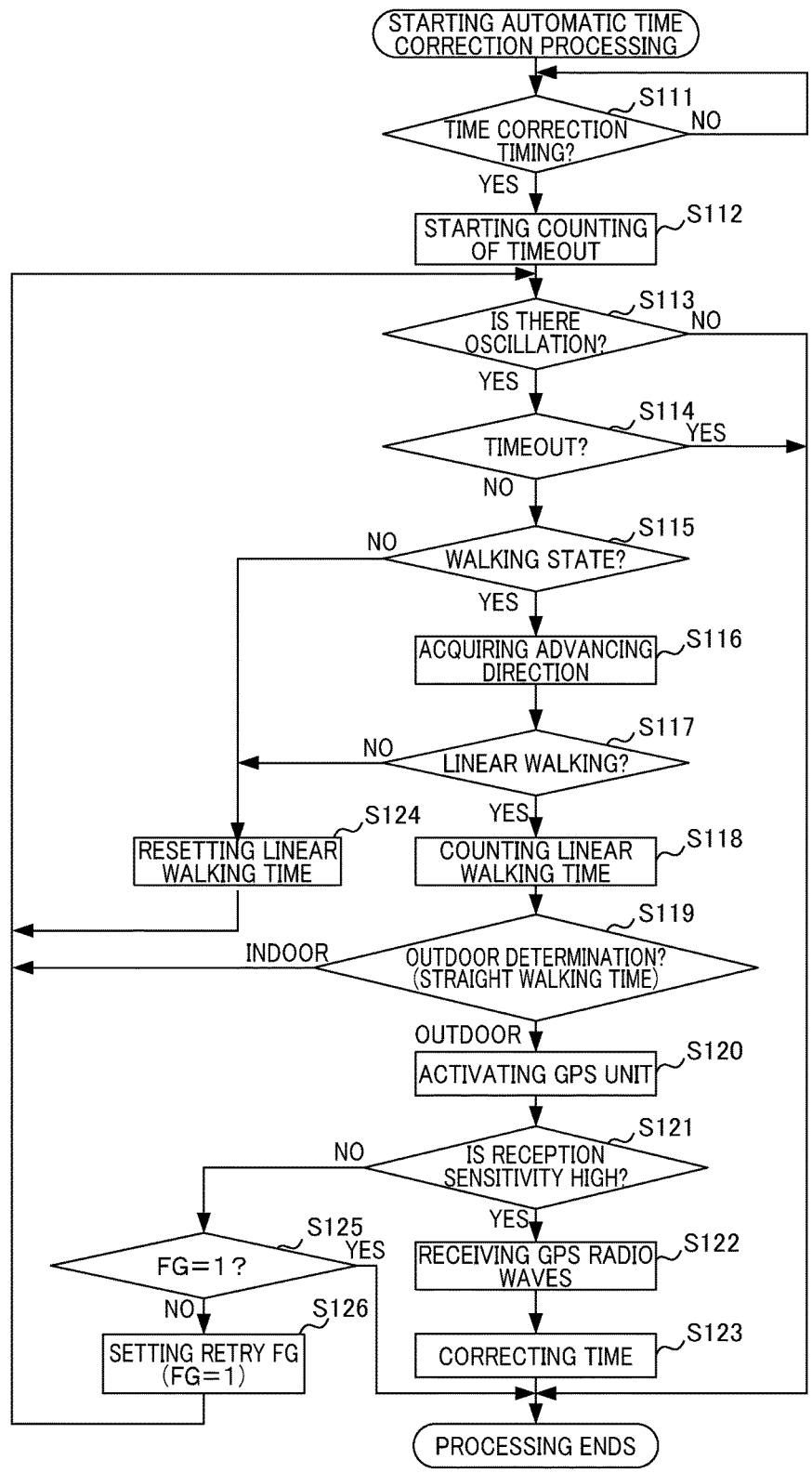
FIG. 4 is a flowchart illustrating the flow of automatic time correction processing of a second embodiment, in the GPS receiving apparatus of FIG. 1 having the functional configuration of FIG. 2.

FIG. 4 is a flowchart illustrating the flow of automatic time correction processing of the second embodiment, in the GPS receiving apparatus of FIG. 1 having the functional configuration of FIG. 2.

In the present example, Steps S116 to S119 and Step S124 differ from flowchart of FIG. 3 of the first embodiment.

In Step S116, the walking state detection unit 51 acquires the advancing direction from the sensor information of the sensor unit 16, and causes it to be stored in the walking information storage unit 71.

In Step S117, the walking determination unit 52 determines whether being straight walking based on the advancing direction.

In the case of not being straight walking, it is determined as NO in Step S117, and the processing advances to Step S124.

In the case of being straight walking, it is determined as YES in Step S117, and the processing advances to Step S118.

In Step S118, the walking determination unit 52 counts a straight walking time for use in determination of outdoor walking.

In Step S119, the walking determination unit 52 performs outdoor determination. In other words, as the outdoor determination, in the present example, the walking determination unit 52 determines as outdoor in the case of having counted a straight walking time of at least 1 minute, and determines as indoor in the case of being less than 1 minute.

In the case of defining as indoor according to the outdoor determination, it is determined as NO in Step S119, and the processing returns to Step S113.

In the case of defining as outdoor according to the outdoor determination, it is determined as YES in Step S119, and the processing advances to Step S120.

By configuring automatic time correction processing of the second embodiment in this way, it is possible to determine a case of walking for a predetermined time at a predetermined bearing as outdoor, and thus reception of GPS radio waves can be performed under this condition.

Third Embodiment

In the first embodiment, outdoor determination is configured so as to count the continuous walking time, and determine as outdoor in the case of a continuous walking time of at least a predetermined time being counted.

In contrast, in the third embodiment, outdoor determination is configured so as to count a cumulative time of walking within a certain time (hereinafter referred to as "cumulative walking time"), and determine as outdoor in the case of a cumulative walking time of at least a predetermined time being counted.

It should be noted that, in cases of being the same configuration as the first embodiment, an explanation thereof will be omitted hereinafter.

In the case of executing the automatic time correction processing of the third embodiment, the walking determination unit 52 in the CPU 11 differs from the first embodiment.

In other words, the walking determination unit 52 counts the cumulative walking time.

Then, the walking determination unit 52 determines as outdoor in the case of the cumulative walking time within a certain time being at least a certain time.

Figure 5:
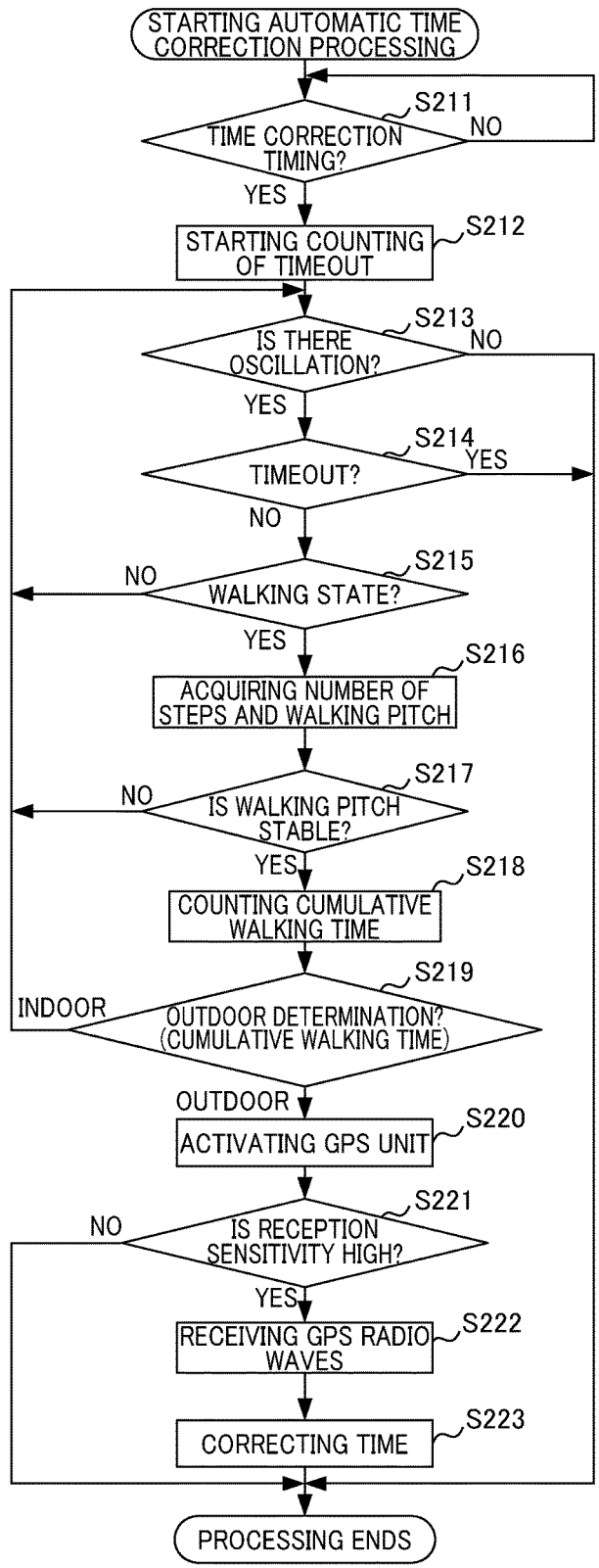
FIG. 5 is a flowchart illustrating the flow of automatic time correction processing of a third embodiment, in the GPS receiving apparatus of FIG. 1 having the functional configuration of FIG. 2.

FIG. 5 is flowchart illustrating the flow of automatic time correction processing of the third embodiment, in the GPS receiving apparatus of FIG. 1 having the functional configuration of FIG. 2.

In the present example, Steps S218 and S219 differ from the flowchart of FIG. 3 for the first embodiment.

In addition, the processing of Step S24 to Step S26 of the first embodiment are omitted for simplification.

In Step S218, the walking determination unit 52 counts the cumulative walking time for use in determination of outdoor walking.

In Step S219, the walking determination unit 52 performs outdoor determination.

In other words, as the outdoor determination, in the present example, the walking determination unit 52 determines as outdoor in the case of counting a cumulative walking time of at least 5 minutes within 10 minutes until timing out, and determines as indoor in the case of being less than 5 minutes.

In the case of defining as indoor by way of the outdoor determination, it is determined as NO in Step S219, and the processing returns to Step S213.

In the case of defining as outdoor by way of the outdoor determination, it is determined as YES in Step S219, and the processing advances to Step S220.

By configuring the automatic time correction processing of the third embodiment in this way, it is possible to determine the cumulative walking time of at least a predetermined time as outdoor, and thus reception of GPS radio waves can be performed under this condition.

The GPS receiving apparatus 1 configured in the above way includes the GPS unit 17, walking state detection unit 51, walking information storage unit 71, walking determination unit 52, and GPS control unit 53.

The GPS unit 17 receives GPS radio waves.

The walking state detection unit 51 determines the walking state of a wearer continuously in a predetermined interval.

The walking information storage unit 71 stores the walking states determined by the walking state detection unit 51.

The walking determination unit 52 determines whether being a state in which GPS radio waves can be received, based on a series of walking states stored in the walking information storage unit 71.

The GPS control unit 53 causes the GPS radio wave receiving means to carry out reception of GPS radio waves in the case of being determined by the walking determination unit 52 as being a receivable state.

With the GPS receiving apparatus 1, it is thereby possible to determine whether GPS can be received at day and night by defining the walking state as a criterion in determination, and it is possible to reliably receive GPS to provide time correction without unnecessary consuming electricity, since the reception operation will not be performed in a state in which GPS reception is not possible.

In other words, with the GPS receiving apparatus 1, it is possible to determine whether a state in which GPS radio waves are receivable without alerting the user, and to reliably perform GPS radio wave reception in the case of being receivable, and further, it is possible to curb electricity consumption due to not causing unnecessary GPS radio wave reception to be carried out in the case of not being receivable.

In addition, the walking determination unit 52 determines as being a state in which GPS radio waves are receivable in the case of being walking in which a series of the walking states stored in the walking information storage unit 71 detected continues for at least a predetermined time.

With the GPS receiving apparatus 1, it is thereby made possible to determine the walking state reliably, and thus GPS can be reliably received to provide time correction, without unnecessarily consuming electricity due to not performing a reception operation in a state in which GPS cannot be received.

In addition, the walking determination unit 52 determines as being in a state in which GPS radio waves can be received in a case of a series of the walking states being linear walking and continuing for at least a predetermined time.

With the GPS receiving apparatus 1, it is thereby made possible to reliably determine the walking state by defining linear movement (advancing direction) and movement time as determination factors, and GPS can be reliably received to provide time correction, without unnecessarily consuming electricity due to not performing a reception operation in a state in which GPS cannot be received.

In addition, the walking determination unit 52 determines as being a state in which GPS radio waves are receivable in the case of a cumulative walking time of a series of the walking states within a certain time being at least a predetermined time.

It is thereby made possible to reliably determine the walking state by defining the cumulative walking time within a certain time as a determination factor, and thus GPS can be reliably received to provide time correction, without unnecessarily consuming electricity due to not performing a reception operation in a state in which GPS cannot be received.

It should be noted that the present invention is not to be limited to the aforementioned embodiment, and that modifications, improvements, etc. within a scope that can achieve the objects of the present invention are also included in the present invention.

In the aforementioned embodiment, although it is configured so as to detect the walking state from the sensor unit 16, it is not limited thereto and, for example, it can be configured so as to acquire from an external device equipped with a sensor means.

In addition, in the aforementioned embodiment, although it is configured as a timepiece-type terminal equipped with a GPS receiving function, the same function can be realized by way of an estimation of outdoor walking so long as configuring so as to equip a GPS function to an external device and between devices, for example, a timepiece-type terminal equipped with a communication function and a GPS-equipped termination (for example, smart phone, etc.) equipping a sensor unit such as an acceleration sensor to either one.

In addition, in the aforementioned embodiment, it is sufficient so long as being able to determine outdoor or indoor and, for example, it may be configured so as to determine indoor or outdoor employing the characteristic of the atmospheric pressure differing between indoor and outdoor, and looking at the state of the atmospheric pressure with an atmospheric pressure sensor means.

More specifically, the determination means provided to the GPS receiving apparatus 1 may be configured so as to use the movement direction and movement time as the determination factors of the walking state.

In addition, in the aforementioned embodiment, as the determination factor for outdoor, although an event of a specific state successively continuing for at least a predetermined time is defined as a determination factor, it is not limited thereto, and it can be configured so as to define the event of a specific state discontinuously but cumulatively continuing as a determination factor.

More specifically, the walking determination unit 52 is configured so as to use not the continuous time, but rather the cumulative time as a determination factor of the walking state, in the case of defining time as a determination factor.

In the aforementioned embodiments, a wristwatch-type terminal has been described as an example of the GPS receiving apparatus 1 to which the present invention is applied; however, the present invention is not particularly limited thereto.

For example, the present invention can be applied to general electronic devices having an automatic time correction processing function.

More specifically, for example, the present invention can be applied to a lap-top personal computer, a printer, a television set, a video camera, a portable navigation device, a cell phone device, a smart phone, a portable gaming device, and the like.

The aforementioned series of processing can be executed by hardware, and can also be executed by software.

In other words, the hardware configuration of FIG. 2 is merely an illustrative example, and is not particularly limited thereto. More specifically, the types of functional blocks employed to realize the above-described functions are not particularly limited to the example of FIG. 2, so long as the GPS receiving apparatus 1 is provided with the functions enabling the aforementioned series of processing to be executed in its entirety.

In addition, a single functional block may be configured by a single piece of hardware, a single installation of software, or any combination thereof.

In a case in which the series of processing is executed by software, a program configuring the software is installed from a network or storage medium to a computer or the like.

The computer may be a computer built-in dedicated hardware.

Alternatively, the computer may be a computer capable of executing various functions, e.g., a general-purpose personal computer, by installing various programs.

The recording medium containing such a program is constituted by a recording medium distributed separately from the device main body for supplying the program to a user, or by a storage medium supplied to the user in a state incorporated in the device main body in advance.

The recording medium is constituted from, for example, a magnetic disk (including a floppy disk), an optical disk, a magneto-optical disk, or the like.

The optical disk is constituted from, for example, a CD-ROM (Compact Disk-Read Only Memory), a DVD (Digital Versatile Disk), a Blu-ray Disc (registered trademark) or the like. The magneto-optical disk is constituted from an MD (Mini-Disk) or the like.

The recording medium supplied to the user in a state incorporated in the device main body in advance is constituted of, for example, the ROM 12 shown in FIG. 1, a hard disk included in the storage unit 20 shown in FIG. 1 or the like, in which the program is recorded.

It should be noted that, in the present specification, the steps describing the program recorded in the recording medium include not only the processing executed in a time series following this order, but also processing executed in parallel or individually, which is not necessarily executed in a time series.

Although some embodiments of the present invention have been described above, these embodiments are merely exemplification, and are not to limit the technical scope of the present invention.

Various other embodiments can be employed for the present invention, and various modifications such as omissions and replacements are possible without departing from the spirit of the present invention.

These embodiments and modifications thereof are included in the scope and spirit of the invention described in the present specification, etc. and are included in the invention recited in the claims as well as the equivalent scope thereof.

What is claimed is:

1. A GPS receiving apparatus comprising:
   a GPS radio wave receiving unit that receives GPS radio waves;
   a walking state determination unit that determines a walking state of a wearer continuously for a predetermined interval;
   a storage unit that stores a walking state determined by the walking state determination unit;
   a determination unit that determines whether the walking state stored in the storage unit is a linear walking state in which linear walking in a same direction continues for at least a predetermined amount of time; and
   a control unit that controls such that reception of GPS radio waves is carried out by the GPS radio wave receiving unit, in a case in which it is determined by the determination unit that the walking state stored in the storage unit is the linear walking state.

2. The GPS receiving apparatus according to claim 1, wherein the determination unit determines, as a state in which GPS radio waves can be received, a state where a cumulative walking time of a series of walking states stored in the storage unit within a certain time is at least a predetermined amount of time.

3. An electric timepiece comprising a GPS receiving apparatus, the GPS receiving apparatus comprising:
   a GPS radio wave receiving unit that receives GPS radio waves;
   a walking state determination unit that determines a walking state of a wearer continuously for a predetermined interval;
   a storage unit that stores a walking state determined by the walking state determination unit;
   a determination unit that determines whether the walking state stored in the storage unit is a linear walking state in which linear walking in a same direction continues for at least a predetermined amount of time; and
   a control unit that controls such that reception of GPS radio waves is carried out by the GPS radio wave receiving unit, in a case in which it is determined by the determination unit that the walking state stored in the storage unit is the linear walking state.

4. A control method executed by a GPS receiving apparatus, the method comprising:
   a walking state determination step of determining a walking state of a wearer continuously in a predetermined interval;
   a storage step of storing a walking state determined in the walking state determination step;
   a determination step of determining whether the walking state stored in the storage step is a linear walking state in which linear walking in a same direction continues for at least a predetermined amount of time; and
   a control step of controlling such that reception of GPS radio waves is carried out by the GPS receiving apparatus, in a case in which it is determined in the determination step that the walking state stored in the storage step is the linear walking state.

5. A non-transitory computer-readable storage medium having a program stored thereon which controls a computer of a GPS receiving apparatus having a GPS radio wave receiving unit that receives GPS radio waves, the program being executable by the computer to control the computer to function as:
   a walking state determination unit that determines a walking state of a wearer continuously for a predetermined interval;
   a storage unit that stores a walking state determined by the walking state determination unit;
   a determination unit that determines whether the walking state stored in the storage unit is a linear walking state in which linear walking in a same direction continues for at least a predetermined amount of time; and
   a control unit that controls such that reception of GPS radio waves is carried out by the GPS radio wave receiving unit, in a case in which it is determined by the determination unit that the walking state stored in the storage unit is the linear walking state.

* * * * *